(12) United States Patent
Lizotte

(10) Patent No.: US 7,307,711 B2
(45) Date of Patent: Dec. 11, 2007

(54) FLUORESCENCE BASED LASER ALIGNMENT AND TESTING OF COMPLEX BEAM DELIVERY SYSTEMS AND LENSES

(75) Inventor: Todd E. Lizotte, Manchester, NH (US)

(73) Assignee: Hitachi Via Mechanics (USA), Inc., Ebina-shi, Kanagawa (JP)

( * ) Notice: Subject to any disclaimer, the term of this patent is extended or adjusted under 35 U.S.C. 154(b) by 34 days.

(21) Appl. No.: 11/259,525

(22) Filed: Oct. 26, 2005

(65) Prior Publication Data
US 2006/0092406 A1 May 4, 2006

Related U.S. Application Data

(60) Provisional application No. 60/652,293, filed on Feb. 11, 2005, provisional application No. 60/623,494, filed on Oct. 29, 2004.

(51) Int. Cl.
*G01B 1/00* (2006.01)
(52) U.S. Cl. .................................................. 356/151
(58) Field of Classification Search ................ 359/618, 359/636, 634, 629–640, 625–627, 359, 838, 359/839, 884; 356/139.04–139.08, 140, 356/141.1, 141.2, 151, 138, 401, 614, 615, 356/620, 139.1, 142, 141.3, 141.5, 153, 154; 33/286, DIG. 21, 227, 290, 291, 293, 297
See application file for complete search history.

(56) References Cited

U.S. PATENT DOCUMENTS 5,252,831 A * 10/1993 Weiss .................... 250/370.11
5,699,188 A * 12/1997 Gilbert et al. ............. 359/584
6,114,704 A * 9/2000 Buck ........................... 250/372
6,208,466 B1 * 3/2001 Liu et al. ..................... 359/584
6,262,830 B1 * 7/2001 Scalora ....................... 359/248
6,396,062 B1 * 5/2002 Buck et al. ................. 250/372
6,636,297 B2 * 10/2003 Wakabayashi et al. ........ 356/51
6,704,340 B2 * 3/2004 Ershov et al. ................. 372/58
7,158,241 B2 * 1/2007 Slesinski et al. ............ 356/620

FOREIGN PATENT DOCUMENTS

JP            08-124828         5/1996
JP            2001-210261       8/2001

* cited by examiner

*Primary Examiner*—Tu T. Nguyen
(74) *Attorney, Agent, or Firm*—Davis Bujold & Daniels, P.L.L.C.

(57) ABSTRACT

Aligning and testing alignment of optical elements in a laser beam delivery system using non-visible radiation. An alignment mirror replaces a beam redirection mirror and includes a fluorescing substrate and a dielectric coating on an incident face of the fluorescing substrate that reflects a major part of an incident laser beam along a next leg of the beam path and transmits a part of the beam into the fluorescing substrate, which is transmissive to visible radiation and fluoresces when irradiated by the beam to emit a visible light image from a back face of the alignment mirror. An alignment target on the back face indicates a preferred point of incidence of the beam on the alignment mirror for a desired alignment of the at least one laser beam. A lens may be tested and the properties of the lens determined by use of a fluorescing target plate.

15 Claims, 9 Drawing Sheets

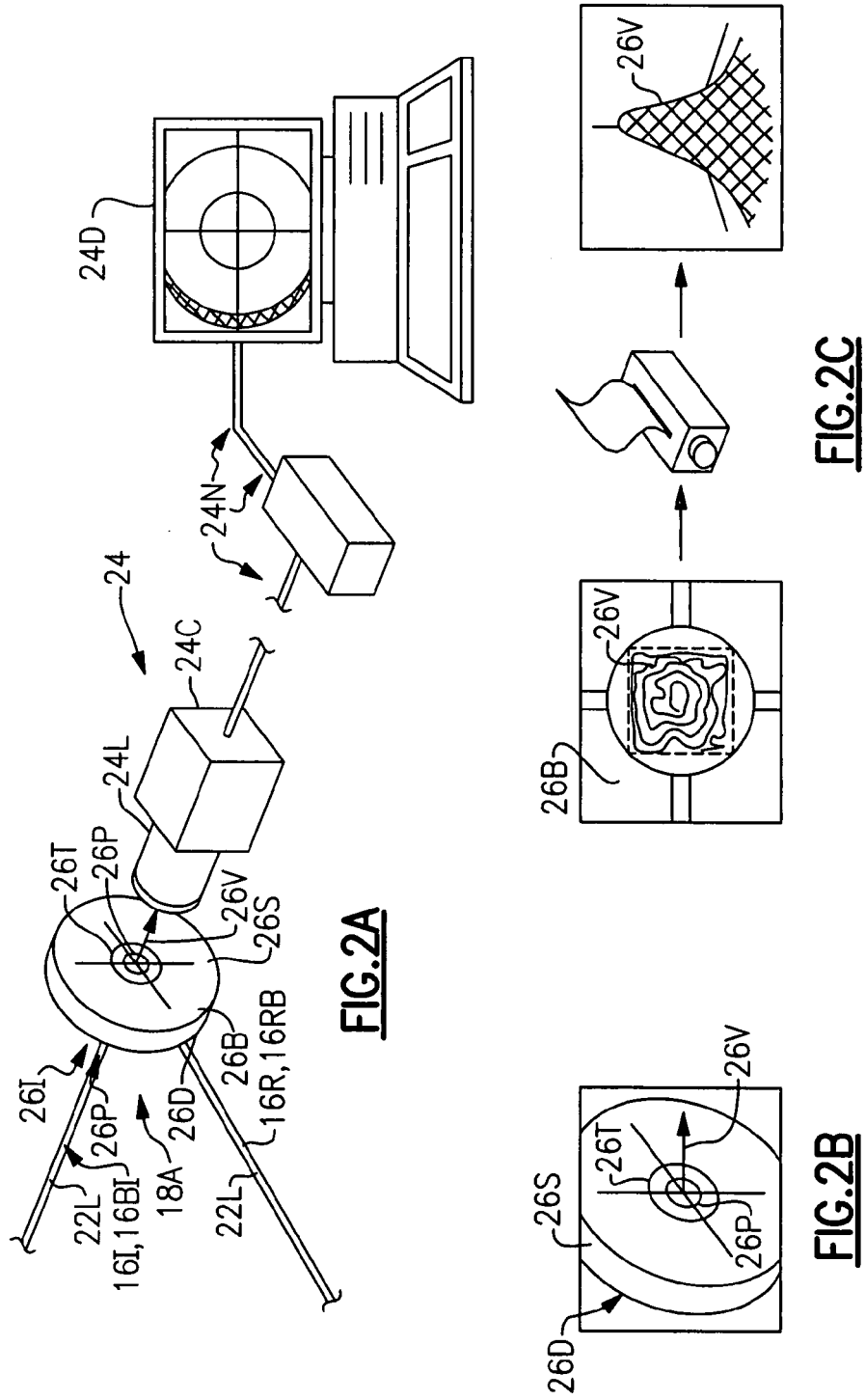

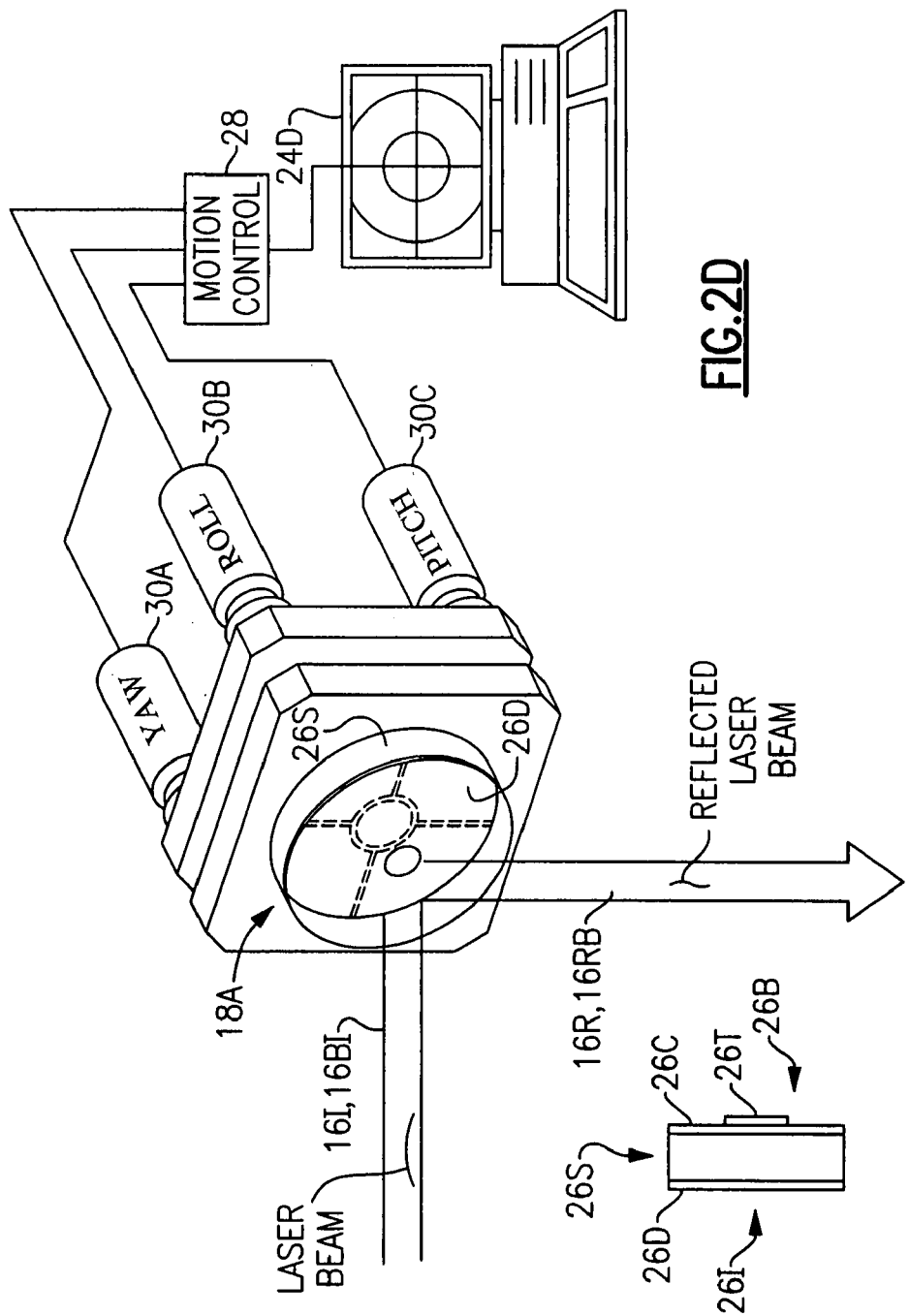

FLUORESCENCE BASED LASER ALIGNMENT AND TESTING OF COMPLEX BEAM DELIVERY SYSTEMS AND LENSES

CROSS REFERENCES TO RELATED APPLICATIONS

The present patent application claims the benefit of Provisional Patent Application Ser. No. 60/623,494 filed Oct. 29, 2004 and claims benefit of Provisional Patent Application Ser. No. 60/652,293 filed Feb. 11, 2005.

FIELD OF THE INVENTION

The present invention is related to a method and apparatus for aligning and testing the optical elements of a complex laser beam delivery system and, in particular, to a method and apparatus for aligning and testing laser system optical elements by indirect observation of alignments and optical element properties indicated by fluorescing indicators.

BACKGROUND OF THE INVENTION

There are a wide range of laser beam delivery systems in common use for various purposes, including micro-machining and medical functions. Virtually all such systems for practical purposes employ complex optical systems comprised of mirrors and lenses of various types to shape, focus and guide the beam, and to "fold" the beam path to reduce the mechanical length of the optical system and to thereby allow a physically more compact system. The optical systems of laser beam delivery systems are typically very complex, however, with certain systems, such as UV (ultraviolet) laser ablation systems used for microvia drilling, requiring up to six or more mirrors and a comparable number arraignment of lenses of various types.

One of the major requirements for use of such systems is the alignment of the elements of the optical system to safely deliver a correctly focus and shaped laser beam at the intended target, which typically requires the individual and joint alignment of each optical element in the system. Stated simply, the alignment process requires that the aligner determine for each optical element, such as a mirror, where the beam strikes the optically functional area of the element. The aligner should also preferably be able to determine the shape or pattern of the beam at that point and possibly the relative power of the beam at that point.

This problem further compounded in that the laser beams generated in many laser beam delivery systems, such as ablation systems, are comprised of "invisible" or "non-visible" radiation, that is, radiation that is not visible to the unaided human eye. Such non-visible radiation may include, for example, UV (ultraviolet) radiation or infrared (IR) radiation, and may also include beams comprised of radiation at wavelengths that are in or near the visible spectrum but that because of other characteristics, such as power and beamwidth, are difficult to see and are thereby effectively "non-visible".

Such beams are also often of relatively high power levels, and are thereby a significant hazard to the eyes of the aligner and user of the system and to any others that may stray into the path of the beam as the aligner, user or bystander may be unaware of a hazard from the beam until damage has been inflicted. This problem is further compounded because it is effectively impossible to align a non-visible radiation system without optical assistance, thereby placing the aligners eye or eyes in the danger zone.

For these reasons, UV systems of the prior art were typically aligned by inserting a piece of white paper into the general and assumed path of the UV beam. White paper typically fluoresces when irradiated with UV radiation, so that a fluorescent spot will appear on the paper indicated the position of the beam, if the paper is in the path of the beam. This method has a number of disadvantages, however. One is that the aligner is exposed to significant levels of scatter radiation, that is, UV radiation reflected from the surface of the paper, which can cause a 'sun burn" type of injury or even photothalmia, which is effectively a sunburn of the eye tissues. The other problem is that the paper effectively blocks the path of the beam, so that if a mirror, for example, is behind the paper, the location at which the beam strikes the surface of the mirror must be estimated from the location at which the beam strikes the paper. This problem becomes more severe, of course, the greater the distance between the paper and the surface of the mirror and can be reduced by placing the paper closely on the surface of the mirror, which may be a problem in itself due to mechanical constraints and the possibility of smearing the surface of the mirror. Yet another problem with this method is that the laser beam sometimes "burns" the paper, resulting in the deposit of contaminates on the mirror or on other optical elements of the system A related problem that is common in laser beam delivery systems is the testing and measurement of various critical performance specifications and properties of the various types of optical elements found in a laser beam delivery system, such as F-theta lenses, beam shaping elements and other imaging lenses.

While this problem is present with many different types of optical elements in laser beam delivery systems, one of the most difficult manifestations of the problem arises with F-theta lenses and similar lenses due to the well known variability of the properties of F-theta lenses, even when manufactured under tight specifications and control. As such, the following discussions will use F-theta lenses as an example of the optical elements that may be tested and measured using the apparatus and methods of the present invention, with the understanding that the discussion of F-theta lenses is illustrative rather than limiting and that the apparatus and methods of the present invention are applicable to other forms and types of optical elements.

Because of the complex interactions of the elements of a laser beam delivery system, a test facility capable of simulating a laser beam delivery system for purposes of testing the optical elements of a laser beam delivery system is effectively, in function, structure and operation, an actual laser beam delivery system. Therefore, and according to current methods, most makers of laser beam delivery systems employing, for example, F-theta lenses, determine whether the lenses do in fact meet specifications by placing the lenses into an actual production laser beam delivery system, processing material through the system, and evaluating the resulting material products.

Not only does this method require that the "test facility" be an actual production laser beam delivery system, but the testing itself is complex and very sensitive and subject to variations in the material properties and to variations in the exact test steps and method.

Also, and while the F-theta lens or lenses installed in a laser beam delivery system may be tested under controlled conditions by appropriately trained personnel before the unit is initially shipped to the system user, it will eventually be necessary to replace the original lens or lenses at the user site. This will typically require that a new lens be shipped to the user from the lens maker or from the system maker and there will again be no assurance that the new lens will perform as specified. As a result, the new lens will typically have to be installed at the use site and again tested in the actual beam delivery system under production conditions. Again, the testing is itself complex and very sensitive and subject to variations in the material properties and to variations in the exact test steps and method and, in this instance, must be done at the user site under less controlled conditions and perhaps by personnel that are not as trained and experienced as were available for the original equipment.

At present, a preferred method for reducing these problems is to over-specify the lenses, such as requiring a larger scan field and higher imaging resolution than is actually required, and using the lens at a reduced performance level to thereby increase the probability that the properties of a given lens will fall within the actual system requirements. This method, however, significantly increases the cost of such optical elements, directly by requiring extensive and complex testing procedures under disadvantageous conditions and increasing the performance requirements of the elements beyond that actually needed and indirectly by reducing the manufacturing yield of the elements.

The present invention provides a solution to these and related problems of the prior art

SUMMARY OF THE INVENTION

In a first aspect, the present invention is directed to a mechanism and method for alignment of optical elements in a laser beam delivery system having a plurality of beam redirection mirrors for directing at least one ultraviolet or infrared laser beam comprised of non-visible radiation, such as UV or IR radiation or effectively non-visible radiation in a visible or near visible portion of the spectrum, along a beam path, and to the alignment mirror employed in the alignment mechanism.

According to the present invention, the alignment mechanism includes at least one alignment mirror located in substitution for a corresponding one of the beam redirection mirrors wherein the mirror includes a fluorescing substrate and a dielectric coating on an incident face of the fluorescing substrate. The dielectric coating reflects a major part of the energy of an incident laser beam as a reflected laser beam along a next leg of the beam path and transmits a lesser part of the energy of the incident laser beam into the fluorescing substrate. The fluorescing substrate, in turn, is transmissive to visible radiation and fluoresces when irradiated by energy of the at least one laser beam so that the energy of the at least one laser beam transmitted into the fluorescing substrate results in an emission of a visible light image from a back face of the alignment mirror. In an alternate embodiment of the mirror, the fluorescing substrate may be comprised of a non-fluorescent sub-strate with a dielectric coating on the incident face and a fluorescent ceramic coating applied to the back, or opposite, face of the substrate so that the visible light image is emitted from the back face of the alignment mirror.

The visible light image indicates a point of incidence of the at least one laser beam on the incident face of the alignment mirror and the mirror will typically include an alignment target on a back face of the alignment mirror indicating a preferred point of incidence of the at least one laser beam on the incident face of the alignment mirror for a desired alignment of the at least one laser beam.

The visible light image transmitted through the fluorescing substrate to a back face of the alignment mirror may also represent at least one of a shape, a focus and a relative energy level of the incident at least one laser beam at the incident face of the alignment mirror and the alignment and properties of the beam or beams may be monitored by a beam monitor aligned on the back face of the alignment mirror to transmit an image of the emission of visible light transmitted through the fluorescing substrate to a back face of the alignment mirror to an alignment display.

In a second aspect, the present invention is directed to a lens testing method and system for determining the properties of various types of test lenses, such as F-theta lenses. The lens testing system includes a laser for generating an ultraviolet or infrared laser beam, a plurality of optical elements for shaping and directing the laser beam along a folded beam path to a test lens to be tested, and a target plate for receiving the beam transmitted through the test lens.

According to the present invention, the target plate is formed of fluorescent glass or a substrate coated with a flourescent substance or material, and the laser beam energy impinging on the target plate results in the generation of a fluorescent visible light image of the beam in the target plate and a transmission of the visible light image through the target plate. The visible light image in turn represents properties of the laser beam after transmission through the test lens and a monitoring mechanism is used to determine the properties of the test lens from the visible light image properties of the beam after transmission through the test lens and the properties of the beam before transmission through the test lens.

The lens testing system may include at least one scanning mirror interposed in the beam path before the test lens for scanning the beam across an operational scanning area of the test lens, and a positioning mechanism for indexing the monitoring mechanism to a point of incidence of the beam on the target plate. The system the plurality of optical elements along the folded beam path may also include at least one of a variable telescope, a beam shaper, an aperture, and at least one steering mirror.

BRIEF DESCRIPTION OF THE DRAWING(S)

The invention will now be described, by way of example, with reference to the accompanying drawings in which:

FIGS. 2A-2E are diagrammatic representations of a monitor mirror and system of the present invention;

DETAILED DESCRIPTION OF THE INVENTION

A. Alignment of Optical Elements in a Laser Beam System (FIGS. 1, 2A-2D)

Figure 1:
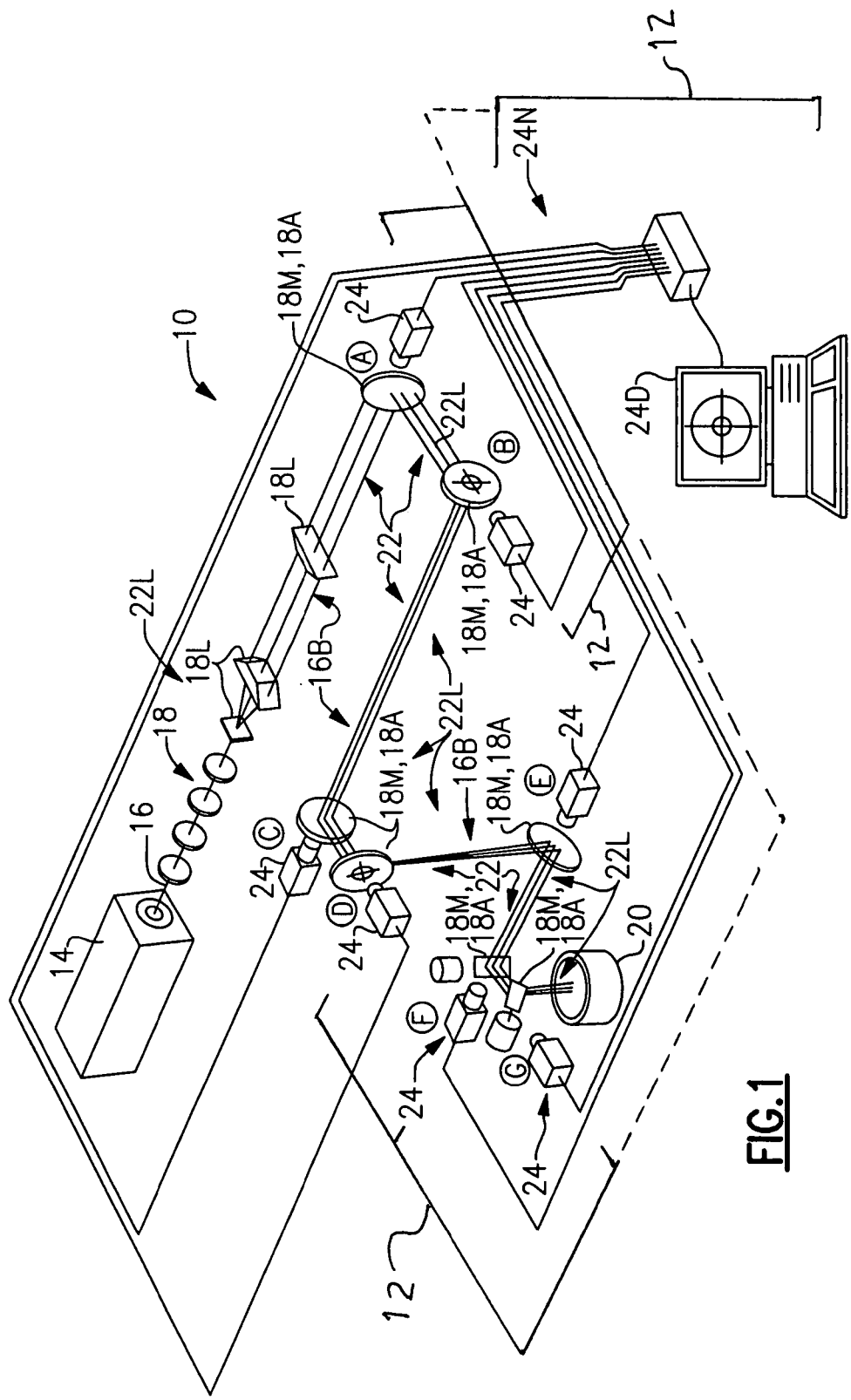
FIG. 1 is a is a diagrammatic representation of a laser beam system in which the alignment method and apparatus of the present invention may be implemented.

First considering the alignment of optical elements in a laser beam delivery system, FIG. 1 is a diagrammatic illustration of a Laser System 10 in which the present invention may be implemented and, as shown and as discussed in detail in the following, includes a Laser Alignment System 12 of the present invention.

As shown in FIG. 1, a System 10 includes a Laser 14 generating a Beam 16 comprised of non-visible radiation, such as ultraviolet (UV) or infrared (IR) energy or effectively non-visible radiation in a visible or near visible portion of the spectrum. The Beam 16 passes through a plurality of shaping and focusing Optical Elements 18 to a Target 20. The Optical Elements 18 of a typical System 10 will typically include or be comprised of either or both of a plurality of Lens 18L type and Mirror 18M type elements arranged to shape and focus the original Beam 16 in a number of ways. Certain Optical Elements 18 may, for example, divide the original Beam 16 into a plurality of Beamlets 16B and will then shape and focus the Beamlets 16B onto the Target 20. In this regard, it will be understood by those of skill in the arts that the Optical Elements 18 may include not only conventional lenses of a wide range of types and functions, but also other types of "lens" elements such as holographic optical elements, diffraction elements, refraction and splitting elements, and so on, telescopic arrangements and beam image forming elements, also referred to as aperture elements. As shown, the Mirror 18M elements will typically be used to direct the Beam 16 and Beamlets 16B along successive Legs 22L of the Beam Path 22 from Laser 14 to Target 20, including folding Beam Path 22 to allow a more compact layout of the System 10.

It is apparent that the determination and adjustment of the alignment, focus and shape of Beam 16/Beamlets 16B along Beam Path 22, must be performed at several points along Beam Path 22, such as at each significant function or operation performed on Beam 16 or Beamlets 16B. Examples of such points along the Beam Path 22 would include those points where the Beam 16 or Beamlets 16B encounter a Lens 18L element or a Mirror 18M element. In particular, the determination and adjustment of the alignment, focus and shape of Beam 16 or Beamlets 16B would preferably be performed at least at the end of each Leg 22L of Beam Path 22 or, in the equivalent, at or before each redirection of Beam Path 22 into a next Leg 22L of Beam Path 22.

In this regard, it will be understood by those of skill in the arts that for a number of reasons the means for determining the alignment, focus and shape of a Beam 16 or Beamlets 16B would preferably not require the placing of an interruption or obstruction in the path of the beam. For example, the insertion of an obstruction in the beam path could result in backscatter or redirection of the Beam 16 of Beamlets 16B in unwanted directions. Also, the placing of some object in the beam path to detect the alignment and possibly the shape and focus of the Beam 16 or Beamlets 16B would require that the object, such as an monitor camera lens, be of a nature so as not to be damaged by the Beam 16 or Beamlets 16B.

It must also be noted that the effect or function of a Lens 18L is dependent upon a Beam 16 or Beamlets 16B being transmitted through the Lens 18L. In particular, in many instances the effect or results of the transmission of a Beam 16 or Beamlets 16B through a Lens 18L on the alignment, focus or shape of a Beam 16 or Beamlets 16B is dependent not only on the characteristics of the lens element itself, but also upon the shape, focus, alignment or angle with which the Beam 16 or Beamlets 16B enter the lens element. For this reason, blocking the path of a Beam 16 or Beamlets 16B through a Lens 18L element may result in a false indication of the alignment, focus or shape of the Beam 16 or Beamlets 16B after that point, that is, after the Beam 16 or Beamlets 16B actually pass through the Lens 18L element.

For these reasons among others, the method and apparatus of the present invention determines the alignment, focus and shape of Beam 16 or Beamlets 16B at Mirrors 18M, that is, at the points where the Beam 16 or Beamlets 16B are redirected into a new Leg 22 of the beam path. As will be described in the following, the method and apparatus of the present invention employ an Alignment Mirror 18A element in place of the Mirrors 18M of a convention system. The Alignment Mirrors 18A of the present invention are capable of indicating the point of incidence of a Beam 16 or Beamlets 16B on the face of the Mirror 18M, and thereby the alignment of the Beam 16 or Beamlets 16B, without obstructing Beam Path 22. As will also be described, an Alignment Mirror 18A of the present invention is also capable of representing the focus and shape of the Beam 16 or Beamlets 16B at the incident face of the Mirror 18M, or of the Beamlets 16B in the case of multiple Beamlets 16B, as well as the alignment of the Beam 16 or Beamlets 16B.

Referring to FIGS. 2A and 2B, FIGS. 2A and 2B are diagrammatic representations of an Alignment Mirror 18A of the present invention and an associated Beam Monitor 24, which includes a Monitor Lens 24L and a Monitor Camera 24C connected through an Alignment Network 24N to an Alignment Display 24D. As indicated in FIGS. 2A and 2B, the Alignment Mirrors 18A of the present invention replace Mirrors 18M and each is comprised of a Fluorescing Substrate 26S with a Mirror Dielectric Coating 26D on Incident Face 26I and an Alignment Target 26T on Back Face 26B.

In a presently preferred embodiment, Fluorescing Substrate 26S is comprised of glass that is generally transparent to visible light and that is doped to fluoresce and emit visible light when Incident Face 26I is irradiated with non-visible radiation, such as UV or IR radiation or effectively non-visible radiation in a visible or near visible portion of the spectrum, from an Incident Beam 16I or one or more Incident Beamlets 16BI.

Mirror Dielectric Coating 26D, in turn, is selected to Incident Face 26I reflect approximately 99% of the Incident Beam 16I or Incident Beamlet 16BI radiation incident on Mirror Dielectric Coating 26D and to transmit approximately 1% of the incident radiation through Mirror Dielectric Coating 26D and into Fluorescent Substrate 26S.

According to the present invention, therefore, the major part of the incident Beam 16 or Beamlet 16B radiation arriving on Incident Face 26I from the previous Leg 22L of Beam Path 22 will be reflected from Mirror Dielectric Coating 26D and redirected into the next Leg 22L of Beam Path 22 in the usual manner as a Reflected Beam 16R or Reflected Beamlet 16BR.

The part of the Incident Beam 16I or Incident Beamlet 16BI radiation arriving on Incident Face 26I that is transmitted through Mirror Dielectric Coating 26D will, however, enter Fluorescent Substrate 26S. The radiation from the Incident Beam 16I or Incident Beamlet 16BI will thereby cause Fluorescent Substrate 26D to fluoresce at the Point of Incidence 26P of the Incident Beam 16I or Incident Beamlet 16BI on Fluorescing Substrate 26S and to thereby emit a Visible Light Image 26V originating from the Point of Incidence 26P. As indicated, Visible Light Image 26V will pass through Fluorescing Substrate 26S to Back Face 26B where the Visible Light Image 26V can be observed, either by a human operator or, preferably, through Beam Monitor 24. The same result will occur when the mirror is comprised of a non-fluorescing transparent substrate with a fluorescent ceramic coating on the back side of the mirror, except that the Visual Light Image 26V will be generated directly on and through the ceramic coating rather than being generated in and transmitted through the main body of the substrate.

It will therefore be apparent that the fluorescence at Point of Incidence 26P indicates the alignment of the Incident Beam 16I or Incident Beamlet 16BI on the reflecting face of the Alignment Mirror 18A, so that the Alignment Mirror 18A, and preceding elements in Beam Path 22, may be adjusted to provide the desired alignments along Beam Path 22. In this regard, it should be noted that Alignment Target 26T on Back Face 26B will assist in determining the location of Point of Incidence 26P with respect to a fixed alignment target provided by Alignment Mirror 18A at a desired Point of Incidence 26P on Incident Face 26I, thereby allowing the Point of Incidence 26P of an Incident Beam 16I or Incident Beamlet 16BI to be aligned onto the Alignment Target 26T.

It must be further noted that, as illustrated in FIG. 2C, the pattern and energy level of Visible Light Image 26V, particularly as viewed from Back Face 26B of Fluorescent Substrate 26S, will also be representative of the shape and focus of Incident Beam 16I or Incident Beamlet 16BI and of the relative energy level of Incident Beam 16I or Incident Beamlet 16BI. For this reason, the method and apparatus of the present invention may also be used to determine the shape, focus and relative energy levels of Beams 16 and Beamlets 16B at each point along Beam Path 22 at which an Alignment Mirror 18A is located. This capability in turn allows more complete control of the alignment of Beams 16 and Beamlets 16B along Beam Path 22. In addition, determination of the shape, focus and energy levels of the beams determinations of the shape, focus and energy levels of Beams 16 and Beamlets 16B along Beam Path 22 allows some direct or indirect control over the effects and adjustments of Lens 18L type elements as well as Alignment Mirrors 18A. As illustrated in FIG. 2C, the shape, focus and energy levels of a Beam 16 or Beamlet 16b or Beamlets 16B as represented by Visible Emission 26V may be displayed and the visual representation may be converted into numeric data that may, in turn, be plotted and displayed in various manners.

Lastly, FIG. 2D illustrates an extension to the System 10 shown in FIG. 2A wherein a Motion Controller 28 connected to a Display/Controller 24D and to Mirror Actuators 30A, 30B and 30C may be used to adjust and control the angles of incidence and reflection of each Alignment Mirror 18A around three axis, thereby allowing full control of the alignment of the Alignment Mirror 18A for each Leg 22L of the Beam Path 22.

In a presently preferred embodiment of an Alignment Mirror 18A, Fluorescent Substrate 26S is comprised of a fluorescent glass and has typical and approximate dimensions of 50 mm outer diameter by 5 to 10 mm in thickness. Typical examples of the fluorescent glass used in the substrates include, for example, SUMITA LUMILASS-R7, -G9 or -B, all available from SUMITA OPTICAL CLASS, INC. The SUMITA LUMILASS-R7, -G9 or -B glasses all fluoresce when stimulated by radiation at various frequencies in the UV range, and respectively emit visible light in the red, green and blue portions of the visible light spectrum.

Mirror Dielectric Coating 26D, in turn, is typically comprised of multilayer dielectric stack deposited on Incident Face 26I by a deposition process. Alignment Target 26T is typically comprised of chrome or gold deposited by a deposition process and typically forms a target or gunsight type pattern formed of a cross or cross hairs and a circle and is of dimensions dependent upon those of the mirror and the beam. The target pattern presented by Alignment Target 26T may also be selected according to the thoughts and desired of the designer regarding what pattern would provide a suitable target for alignment purposes.

In an alternate embodiment, illustrated in FIG. 2E, Fluorescent Substrate 26S may be comprised of a non-fluorescent material, such as a glass, with Dielectric Coating 26D on Incident Face 26I and a Fluorescent Ceramic Coating 26C and an Alignment Target 26T applied of deposited on Back Face 26B. In this embodiment of an Alignment Mirror 18A, the Incident Beam 16I or Incident Beamlet 16BIn will pass through the main body of the substrate to and the Visible Light Image 26V will be emitted from Fluorescent Ceramic Coating 26C rather than from within the material of the Fluorescent Substrate 26S.

B. Testing of Optical Elements for a Laser Beam System (FIGS. 3A, 3B)

As described previously, the method and apparatus of the present invention may be further extended for use in the testing of optical elements, such as F-theta lenses and other lenses, for a laser beam delivery system.

Figure 3A:
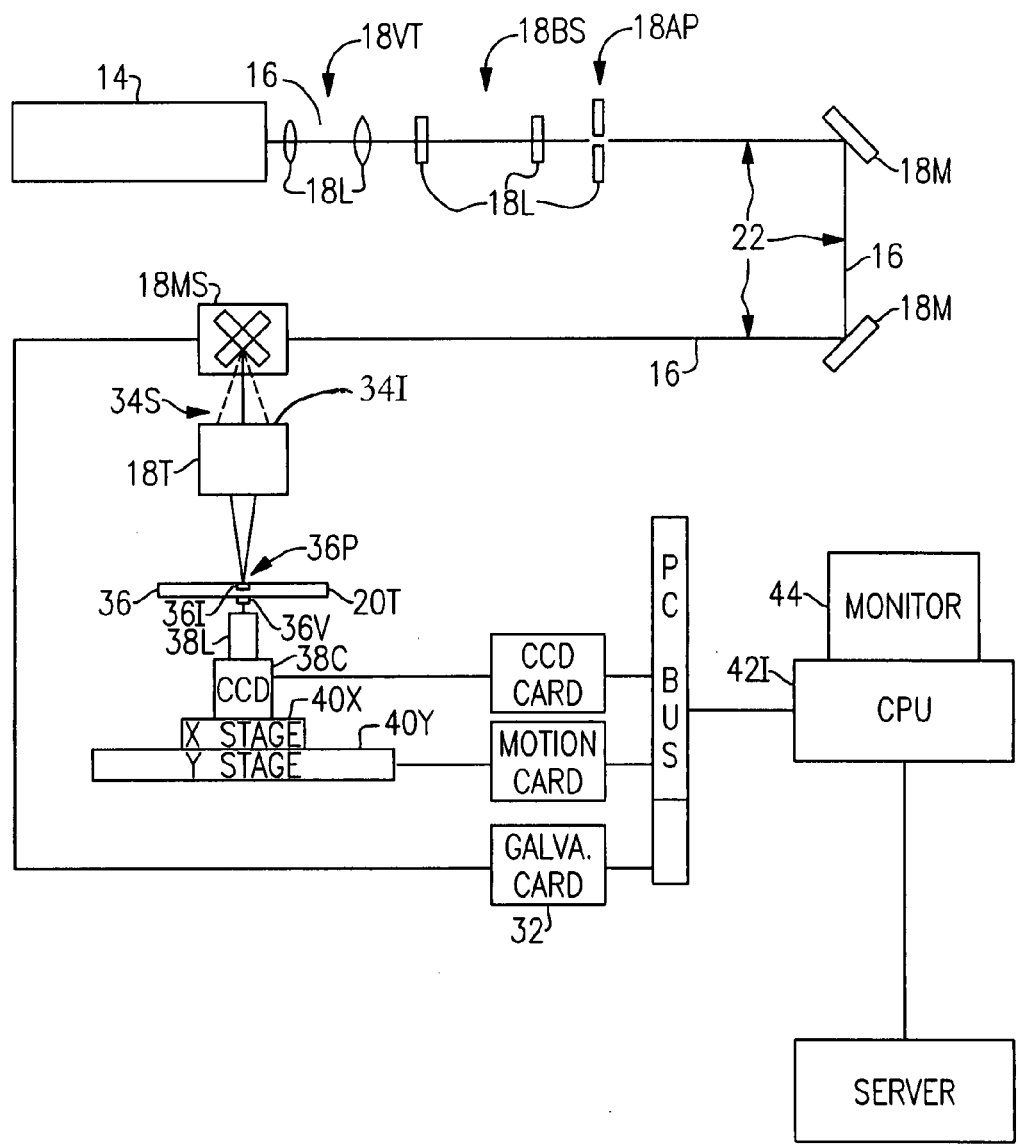
FIG. 3A is a diagrammatic representation of the lens testing method and apparatus of the present invention.
Figure 3B:
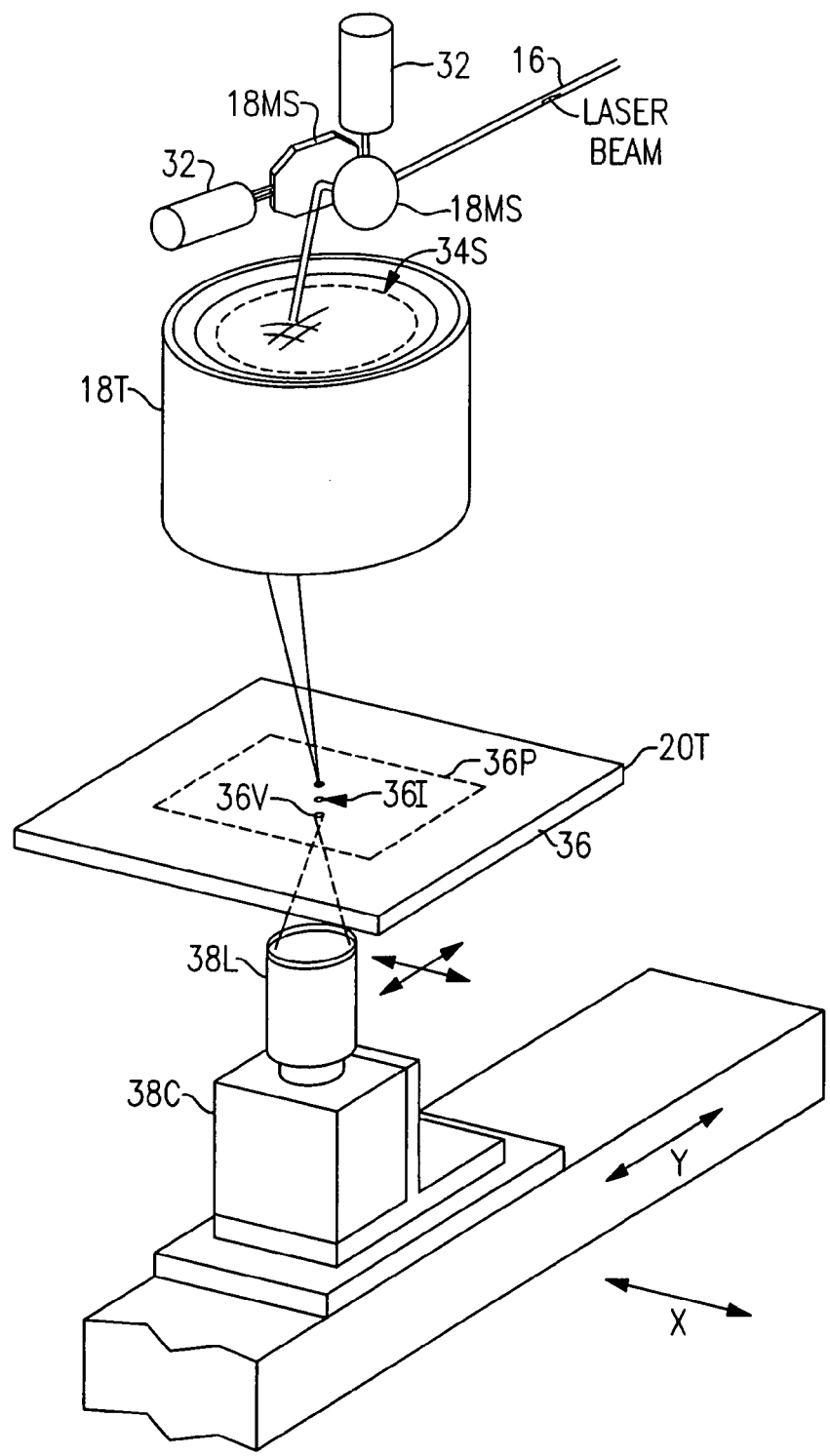
FIG. 3B is a diagrammatic isometric view of the lens testing method and apparatus.

Referring to FIGS. 3A and 3B, therein is shown a diagrammatic representation of a Lens Test System 12 of the present invention may be implemented. As illustrated therein, and as discussed above with reference to FIG. 1, the System 12 will be generally similar in many respects to a Laser Beam System 10 and will typically include a Laser 14 generating a Beam 16 which passes along a Beam Path 22 through a plurality of shaping and focusing Optical Elements 18 to a Target 20. In a typical Lens Test System 12, Beam 16 may be comprised of, for example, non-visible radiation, such as UV or IR radiation or effectively non-visible radiation in a visible or near visible portion of the spectrum, depending upon the type of lens being tested and the spectrum of interest for testing the lens.

As in the instance of a Laser Beam System 10, a typical Lens Test System 12 will typically include a plurality of Optical Elements 18, certain of which will direct, shape and focus the original Beam 16 in a number of ways and others of which will divide the original Beam 16 into a plurality of Beamlets 16B and will then shape and focus the Beamlets 16B onto the Target 20. As shown, and as illustrated with respect to a System 10 as discussed above, the Optical Elements 18 of a Lens Test System 12 will also typically include a plurality of Mirrors 18M which direct and steer the Beam 16 and Beamlets 16B along successive Legs 22L of the Beam Path 22 from Laser 14 to Test Target 20T, including folding Beam Path 22 to allow a more compact layout of the System 12.

It will be understood by those of skill in the arts that the Optical Elements 18 of a Lens Test System 12 may include conventional lenses of a wide range of types and functions, as well as other types of "lens" elements, such as holographic optical elements, diffraction elements, refraction and splitting elements, and so on. In particular, and according to the present invention, the Lens Test System 12 will also include at least one Test Lens 18T whose properties, characteristics and specifications are to be tested and determined, such as an F-theta type lens.

As shown in FIGS. 3A and 3B, the Optical Elements 18 of a Lens Test System 12 include a optional Optical Elements 18, the selection and arrangement of which are dependent upon the specific type of Test Lens 18T and the test conditions and requirements for testing and measuring the Test Lens 18T. For example, a Lens Test System 12 will typically include a Variable Telescope 18VT to focus and control the size of the Beam 16 and may include an optional Beam Shaper 18BS to model the Beam 16 wavefront and an optional Aperture 18AP to shape the cross section image of the Beam 16 to thereby simulate an imaging system. The Lens Test System 12 will also typically include a number of Mirrors 18M to direct Beam 16 through a folded and extended Beam Path 22 that terminates in Scanning Mirrors 18MS that are controlled by Galvanometers 32 that may be controlled to scan the Beam 16 over an Operational Lens Scanning Area 34S of the Test Lens 18T if necessary or desired.

According to the present invention, Test Target 20 is comprised of a Target Plate 36 formed of a glass that fluoresces when stimulate by the radiation comprising Beam 16, that is, when stimulated by, for example, non-visible radiation, such as UV or IR radiation or effectively non-visible radiation in a visible or near visible portion of the spectrum. Typical examples of such materials have been discussed herein above with regard to Alignment Mirrors 18M.

In an alternate embodiment, Test Target 20 may be comprised of a non-fluorescent sub-strate with a fluorescent ceramic coating applied to either the incident face or the back face of the substrate, such as also discussed herein above.

The incidence of Beam 16 on Target Plate 36 will thereby result in the generation of a Fluorescent Visible Light Image 36I where Beam 16 impinges on Target Plate 36. Fluorescent Visible Light Image 36I is transmitted through the Target Plate 36 as a Visible Light Image 36V and the Visible Light Image 36I and the location of the Visible Light Image 36I, which corresponds to the location of the Fluorescent Image 36I, are monitored and determined by an Imaging Lens 38L and Camera 38C, such as a CCD camera. In this regard, and particularly if the Beam 16 impinging on Test Lens 18 is scanned across Operational Scanning Area 34S of the Test Lens 18T by one or more Scanning Mirrors 18MS, Fluorescent Visible Light Image 36I and the Visible Light Image 36I will appear in and on Target Plate 36 in a Plate Scanning Area 36P. The location of Fluorescent Visible Light Image 36I may typically be determined by indexing Imaging Lens 38L and Camera 38C to the location of Visible Light Image 36V within the plane of Target Plate 36 by means of X- and Y-Motion Stages 40X and 40Y.

The location, shape, intensity pattern and so on of the Visible Light Image 36V will then represent and define the characteristics and properties of the impinging Beam 16, which are determined by means of a Computer System 42 with Display 44. At the same time, the characteristics and properties of Beam 16 as it impinges on Test Lens 18T are known, including the position and angle at which the Beam 16 impinges upon Test Lens 18T. As will be well understood by those of ordinary skill in the arts, the characteristics and properties of Beam 16 at Input Side 34I will be determined in part by Computer System 42, which controls, for example, Mirrors 18M and 18MS, and in part by the selected and known characteristics of, for example, Variable Telescope 18VT, Beam Shaper 18BS, Aperture 18AP. The characteristics and properties of the Beam 16 at Target Plate 36 as determined from Visible Light Image 36V may then be compared with the known, defined and controlled characteristics of the Beam 16 at the point the Beam 16 impinges on the Test Lens 18T, thereby allowing the characteristics and properties of the Test Lens 18T to be determined. In this regard, it must be noted that the characteristics and properties of the Test Lens 18T may be determined and mapped over the entire Operational Scanning Area 34S of a Test Lens 18T by scanning the impinging Beam 18 across the Operational Scanning Area 34S by the operation of Scanning Mirrors 18MS.

C. Further Aspects and Implementations

Figure 4A:
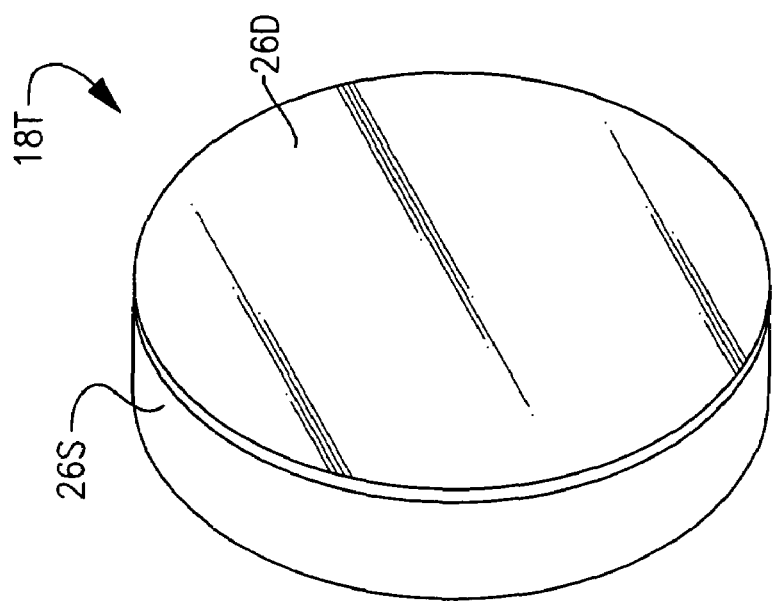
FIGS. 4A-4D are illustrating diagrams of the construction of turning and galvanometer mirrors.
Figure 4B:
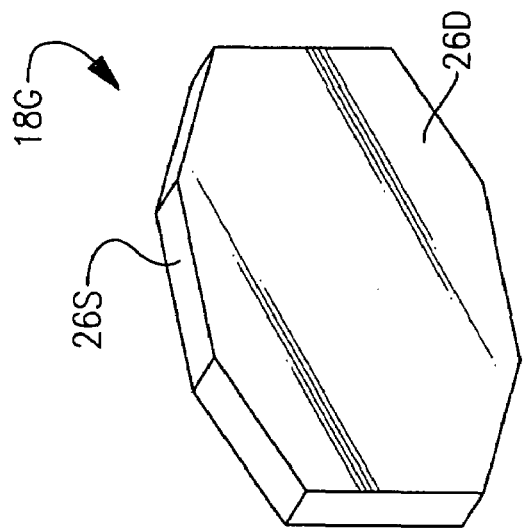

Next considering further aspects, embodiments and implementations of the above described invention, as illustrated in FIGS. 4A and 4B the Alignment Mirrors 18A and Scanning Mirrors 18MS of the present invention as described above may be generally described as comprised of Turning Mirrors 18T and Galvanometer Mirrors 18G. Turning Mirrors 18T are typically employed to redirect or turn a beam path and thus the beam traveling along the beam path and are referred to as such because they are used to "turn" the beam through an angle, but are not continuously adjusted or moved during normal operation. Galvanometer Mirrors 18G, in turn, are typically used to dynamically turn or redirect a beam during normal operation, such as to dynamically redirect or steer a beam in a scanning pattern. As such, Galvanometer Mirrors 18G are generally supported and controlled by some form of dynamically variable mechanism capable or rapid movement of the mirror during normal and continuous operation, such as a galvanometer. A Turning Mirror 18T, however, typically adjusted or repositioned only at much longer intervals and can be repositioned relatively slowly.

Figure 4D:
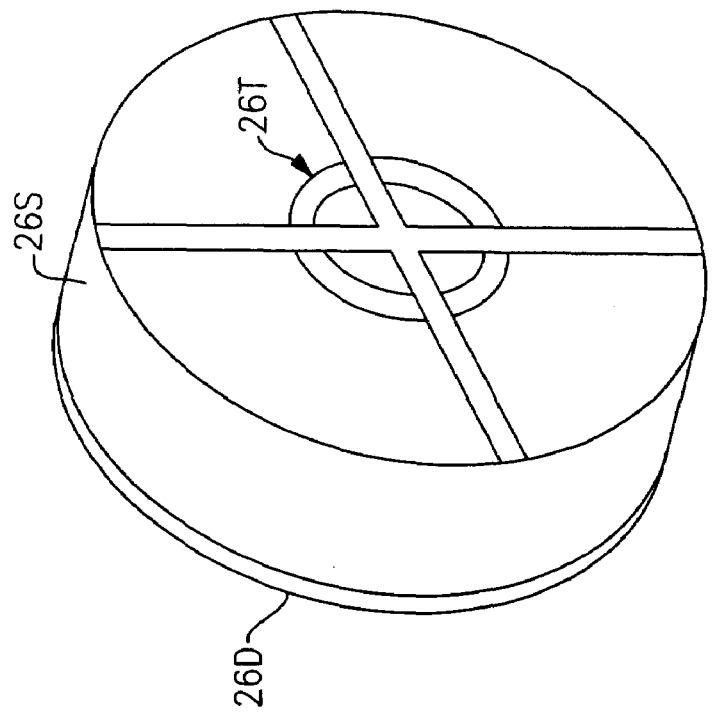
Figure 4C:
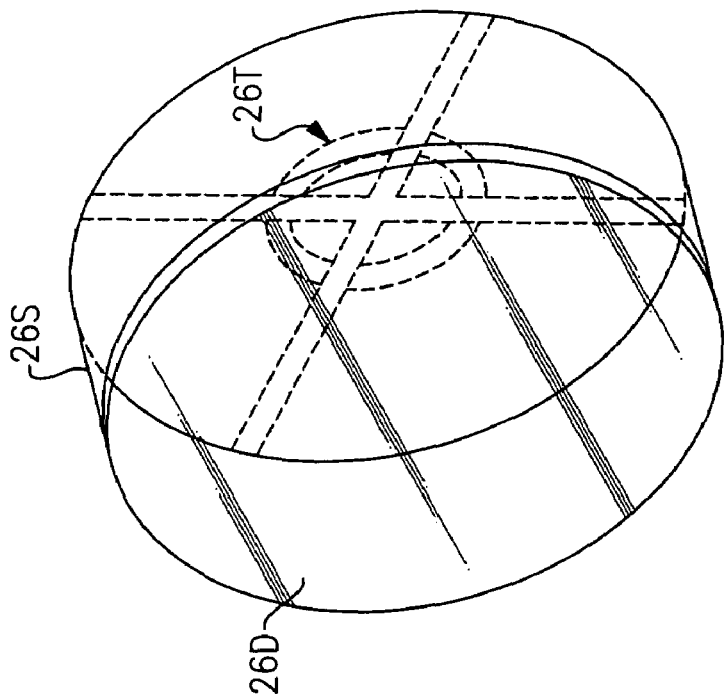

As a consequence and as indicated in FIGS. 4A and 4B, Turning Mirrors 18T and Galvanometer Mirrors 18G are typically of different shapes, each shape being selected as optimal or at least preferable for its particular application. For example, a Turning Mirror 18T is preferably round to allow a wider field of capture of a non- or mis-aligned beam. A Galvanometer Mirror 18G, however, does not require as large a capture field as it will typically be receiving a beam that has been correctly aligned by means, for example, of a Turning Mirror 18T, but preferably is of reduced mass and inertial moment as it typically must be rapidly redirectable, or scannable. As illustrated in FIG. 4B, therefore, Galvanometer Mirror 18G would typically have a shape providing an adequate capture area with a reduced inertial moment, such as a hexagon. As illustrated in FIGS. 4C and 4D, a Turning Mirror 18T or Galvanometer Mirror 18G of the present invention is typically constructed of a Fluorescing Substrate 26S with a Mirror Dielectric Coating 26D on one face as the reflective surface of the mirror. As also described, a Fluorescing Substrate 26S is comprised of glass that is generally transparent to visible light and that is doped to fluoresce and emit visible light when Incident Face 26I is irradiated with non-visible radiation, such as UV or IR radiation or effectively non-visible radiation in a visible or near visible portion of the spectrum, from an Incident Beam 16I or one or more Incident Beamlets 16BI.

In a presently preferred embodiment, the substrate can be created by a formulation of 1:10 ratio of fluorescent frit to bulk glass material, such BK7. Varying the ratio from 1:5 to 1:20 allows differing degrees of fluorescing brightness. The substrate is then created by a vacuum furnace which melts the materials together. This type of furnace process is typically used in the glass fabrication industry. The fluorescent frit materials or bulk materials can be sourced from Spruce Pin Batch Company, S. Carolina USA and Sumita Optical Glass Co., Japan.

In this regard, it must be noted that the fluorescing components of the substrated may be comprised of dopants embedded into the substrate, as described above, or, in an alternate embodiment, dopants coated onto the substrate. In further alternative embodiments, the fluorescing component may be comprised of a layer of fluorescing material located on a back face of the substrate, such as under the Alignment Target 26T described below, or of a layer of fluorescing material located under the dielectric coating on the front face of the substrate, as described next below.

A Mirror Dielectric Coating 26D, in turn, is typically comprised of multilayer dielectric stack deposited on Incident Face 26I by a deposition process. and, in the present implementations, is typically selected to reflect approximately 99% of the Incident Beam 16I or Incident Beamlet 16BI radiation and to transmit approximately 1% of the incident radiation through Mirror Dielectric Coating 26D and into Fluorescent Substrate 26S.

As also illustrated in FIGS. 4C and 4D, and as discussed previously, a Turning Mirror 18T or Galvanometer Mirror 18 typically also includes an Alignment Target 26T on Back Face 26B of the mirror to assist in determining the position of the Incident Beam 16I on the reflecting face of the mirror location of Point of Incidence 26P. As has been discussed above, the Alignment Target 26T indicates the desired point of incidence of the Incident Beam 16I on the reflecting face of the mirror while the flourescent Visible Light Image 26V formed by Incident Beam 16I passing into the Fluorescent Substrate 26S indicates the actual point of incidence of the Incident Beam 16I on the mirror, as monitored by, for example, a Beam Monitor 24. The user or system may then align the Visible Light Image 26V and thereby the Incident Beam 16I onto the desired point on the mirror to provide the desired alignment of the beam. As also described, an Alignment Target 26T is typically comprised of chrome or gold deposited by a deposition process and typically forms a target or gunsight type pattern formed of a cross or cross hairs and a circle and is of dimensions dependent upon those of the mirror and the beam. The target pattern presented by Alignment Target 26T may also be selected according to the thoughts and desirer of the designer regarding what pattern would provide a suitable target for alignment purposes.

In alternate embodiments of Turning Mirrors 18T or Galvanometer Mirrors 18G, Fluorescent Substrate 26S may be comprised of a non-fluorescent material, such as a glass, with a Dielectric Coating 26D on Incident Face 26I and a Fluorescent Ceramic Coating 26C and an Alignment Target 26T applied of deposited on Back Face 26B. In this embodiment, the Incident Beam 16I or Incident Beamlet 16B will pass through the main body of the substrate to the Fluorescent Ceramic Coating 26C and the Visible Light Image 26V will be emitted from Fluorescent Ceramic Coating 26C rather than from within the material of the Fluorescent Substrate 26S.

Figure 5:
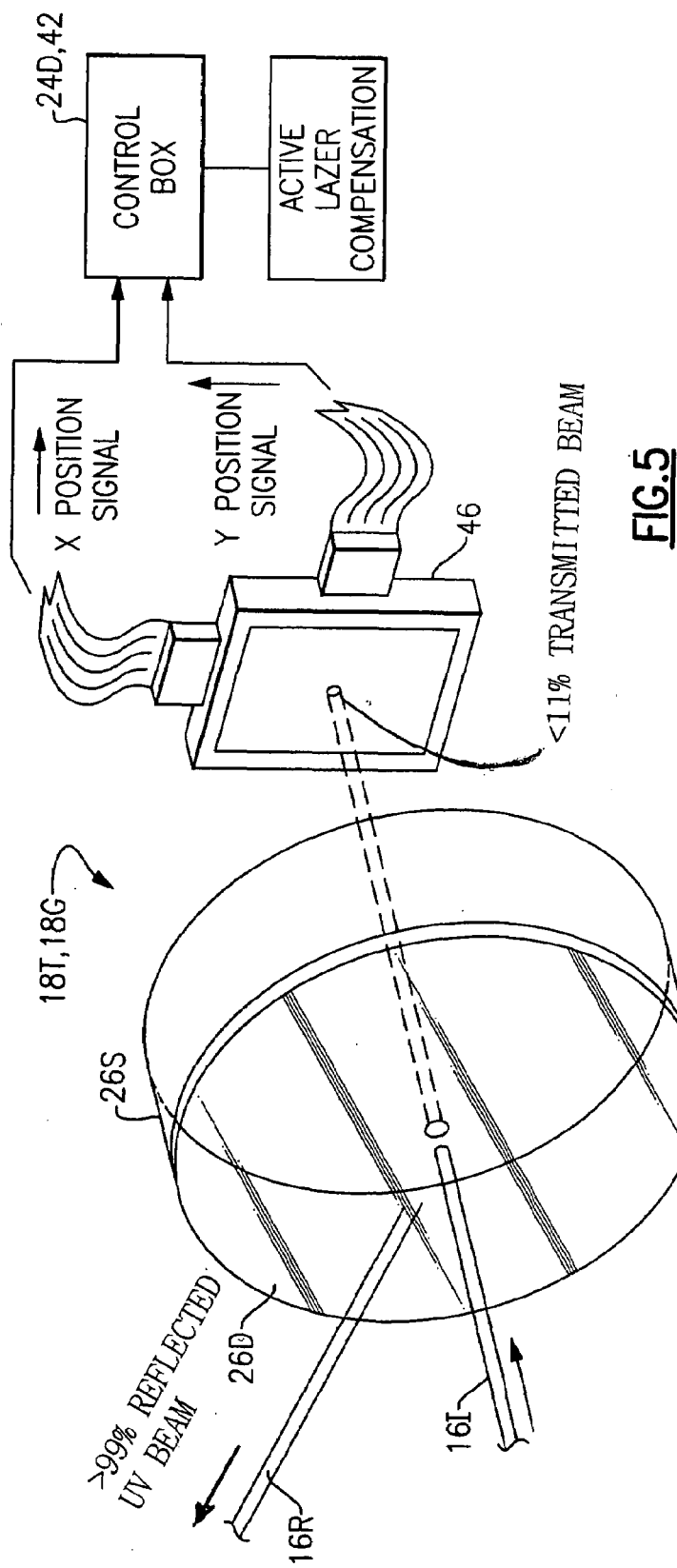
FIG. 5 is a diagram of an alignment mechanism employing a position sensor.

Referring now to FIG. 5, therein is illustrated a further embodiment of the beam alignment system described above with regard to FIGS. 2A-2D. The Turning Mirror 18T or Galvanometer Mirror 18G again typically includes a Fluorescing Substrate 26S with a Mirror Dielectric Coating 26D on the front face as the reflective surface of the mirror, but typically does not include an Alignment Target 26T on the back surface of the mirror. The functions of an Alignment Target 26T and a Beam Monitor 24 are instead performed by a Position Sensor 46 that is located on or close to the back surface of the mirror and that directly senses and indicates the position of the Visible Light Image 26V within the detection area of the Position Sensor 46. A Position Sensor 46 may be comprised, for example, of a unitary two dimensional array of cells generating row and column output signals on row and column output lines. Each row signal and each column signal is proportionate to the illumination striking the cell at the intersection represented by the corresponding row and column signal lines, thereby indicating the point of incidence of Visible Light Image 26V on the array and thus the position of incidence of Incident Beam 16I on the mirror. In an alternate embodiment, the Position Sensor 46 may be comprised of several sensor arrays, such as a silicon quad sensor, rather than a unitary uniform array of sensor cells.

As described herein above with reference, for example, to FIGS. 1, 2A-2D and 3A and 3B, the output signals of Position Sensor 46 indicating the position of the Visible Light Image 26V within the detection area of the Position Sensor 46 thus the position of incidence of Incident Beam 16I on the mirror may then be provided to a mirror orientation controller, such as a Computer System 42. The mirror orient can then adjust the orientations of the Turning Mirrors 18T or Galvanometer Mirrors 18G so that the Incident Beam 16I is incident to the desired locations on each Turning Mirror 18T or Galvanometer Mirror 18G so that the beam is directed along the desired path.

Figure 6:
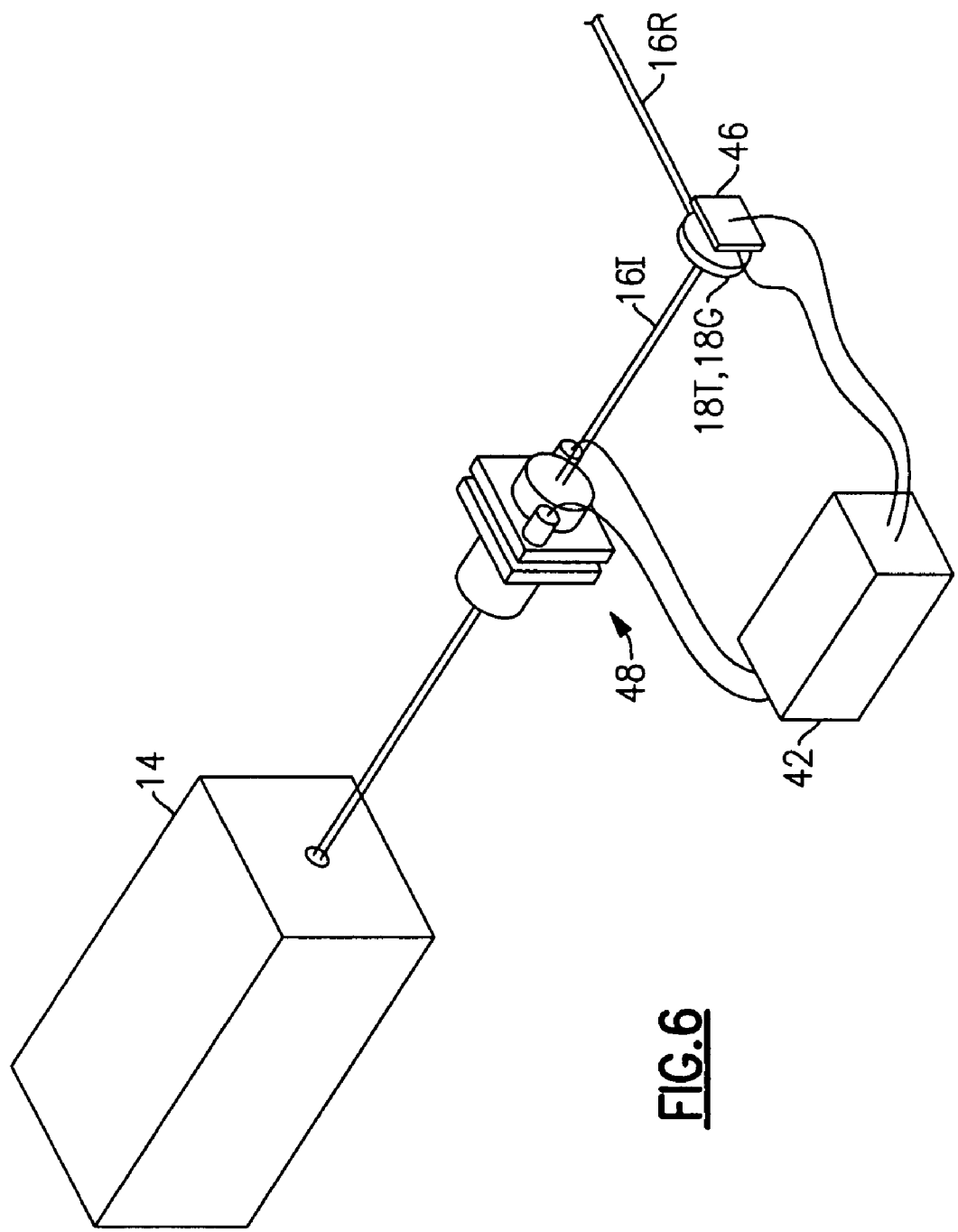
FIG. 6 is a diagram of one stage of a laser beam system alignment system.

Referring lastly to FIG. 6, therein is shown an exemplary system or portion of a system incorporating the above described invention for guiding a laser beam along a desired path or to a desired target. As illustrated, the system or illustrated portion thereof includes a Laser 14 for generating a Laser Beam 16 that is incident on, for example, a Turning Mirror 18T and that is reflected as a Reflected Beam 16R directed along the desired path or to a desired target. As indicated, the Turning Mirror 18T is provided with a Position Sensor 46 that generates beam position outputs to a Computer 42, or other implementation of a beam path correction control box, that in turn generates control signal outputs to a Kinematic Wedge Beam Drift Corrector (Wedge Beam Corrector) 48. As illustrated, the Wedge Beam Corrector 48 is interposed in the path of Incident Beam 16I, that is, in the path of the beam before the mirror, to adjust the point of incidence of the beam on the Turning Mirror 18T and to thereby adjust the alignment of the beam. As will be understood by those of ordinary skill in the relevant arts, a Wedge Beam Drift Corrector 48 is essentially a rotatable prism having a wedge shaped profile wherein the angle and direction of the "wedge" is variable with rotation of the prism, so that the direction and angle through which an input beam is redirected is selectable by rotation of the prism. Wedge Beam Corrector 48 thereby redirects the incoming beam in the direction and angle determined by the control signals to obtain the desired point of incidence of the Incident Beam 16I on the Turning Mirror 18T or Galvanometer Mirror 18G.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A laser beam alignment mechanism for alignment of optical elements in a laser beam delivery system having a plurality of beam redirection mirrors for directing at least one laser beam along a beam path, comprising:
at least one alignment mirror located in substitution for a corresponding one of the beam redirection mirrors,
the alignment mirror including
a fluorescing substrate, and
a dielectric coating on an incident face of the fluorescing substrate, the fluorescing substrate is transmissive to visible radiation and fluoresces when irradiated by energy of the at least one laser beam, and the dielectric coating reflects a major part of the energy of an incident laser beam as a reflected laser beam along a next leg of the beam path, and transmits a lesser part of the energy of the incident laser beam into the fluorescing substrate, wherein the energy of the at least one laser beam transmitted into the fluorescing substrate results in an emission of a visible light image from a back face of the alignment mirror, the visible light image indicating a point of incidence of the at least one laser beam on the incident face of the alignment mirror.

2. The laser beam alignment mirror of claim 1, further including:

an alignment target on a back face of the alignment mirror indicating a preferred point of incidence of the at least one laser beam on the incident face of the alignment mirror for a desired alignment of the at least one laser beam.

3. The laser beam alignment mirror of claim 1, wherein:
the visible light image from a back face of the alignment mirror represents at least one of a shape, a focus and a relative energy level of the incident at least one laser beam at the incident face of the alignment mirror.

4. The laser beam alignment mirror of claim 1, further including:

a beam monitor aligned on the back face of the alignment mirror to transmit an image of the emission of visible light from a back face of the alignment mirror to an alignment display.

5. The laser beam alignment mirror of claim 1 wherein the laser beam is an ultraviolet beam.

6. The laser beam alignment mirror of claim 1 wherein the laser beam is an infrared beam.

7. The laser beam alignment mirror of claim 1 wherein the fluorescing substrate is fluorescing glass.

8. The laser beam alignment mirror of claim 1 wherein the fluorescing substrate includes a non-fluorescing glass substrate and a fluorescing element.

9. A laser beam alignment mirror for use in a laser beam delivery system having at least one alignment mirror for directing at least one laser beam along a beam path, the alignment mirror comprising:

a fluorescing substrate, and a dielectric coating on an incident face of the fluorescing substrate, wherein the dielectric coating reflects a major part of the energy of an incident laser beam as a reflected laser beam along a next leg of the beam path, and transmits a lesser part of the energy of the incident laser beam into the fluorescing substrate, wherein the fluorescing substrate is transmissive to visible radiation and fluoresces when irradiated by the at least one laser beam, and the energy of the at least one laser beam transmitted into the fluorescing substrate results in an emission of a visible light image from a back face of the alignment mirror, the visible light image indicating a point of incidence of the at least one laser beam on the incident face of the alignment mirror.

10. The laser beam alignment mirror of claim 9, further including:

an alignment target on a back face of the alignment mirror indicating a preferred point of incidence of the at least one laser beam on the incident face of the alignment mirror for a desired alignment of the at least one laser beam.

11. The laser beam alignment mirror of claim 9, wherein:
the visible light image emitted from a back face of the alignment mirror represents at least one of a shape, a focus and a relative energy level of the incident at least one laser beam at the incident face of the alignment mirror.

12. The laser beam alignment mirror of claim 9 wherein the laser beam is an ultraviolet beam.

13. The laser beam alignment mirror of claim 9 wherein the laser beam is an infrared beam.

14. The laser beam alignment mirror of claim 9 wherein the fluorescing substrate is fluorescing glass.

15. The laser beam alignment mirror of claim 9 wherein the fluorescing substrate includes a non-fluorescing glass substrate and a fluorescing element.

* * * * *